United States Patent [19]

Michel

[11] Patent Number: 5,002,328
[45] Date of Patent: Mar. 26, 1991

[54] DRIVE SYSTEM FOR FLEXIBLE COVER

[76] Inventor: Walter Michel, P.O. Box 119, St. Gregor, Saskatchewan, Canada, S0K 3X0

[21] Appl. No.: 362,042

[22] Filed: Jun. 6, 1989

[51] Int. Cl.⁵ .............................................. B60J 11/00
[52] U.S. Cl. ........................................................ 296/98
[58] Field of Search .................... 296/98, 100; 242/107

[56] References Cited

U.S. PATENT DOCUMENTS

| | | | |
|---|---|---|---|
| 2,976,082 | 3/1961 | Dahlman | 296/98 |
| 3,384,413 | 5/1968 | Sargent . | |
| 3,549,198 | 12/1970 | Cappello . | |
| 3,854,770 | 12/1974 | Grise et al. | 296/98 |
| 4,050,734 | 9/1977 | Richard | 296/98 |
| 4,082,347 | 4/1978 | Petretti . | |
| 4,095,840 | 6/1978 | Woodard . | |
| 4,290,564 | 9/1981 | Karlsson | 242/107 |
| 4,302,043 | 11/1981 | Dimmer et al. . | |
| 4,341,416 | 7/1982 | Richard . | |
| 4,380,350 | 4/1983 | Block . | |
| 4,484,777 | 11/1984 | Michel . | |
| 4,505,512 | 3/1985 | Schmeichel et al. . | |
| 4,518,193 | 5/1985 | Heider et al. . | |
| 4,529,098 | 7/1985 | Heider et al. . | |
| 4,673,208 | 6/1987 | Tsukamoto . | |
| 4,834,445 | 5/1989 | Odegaard | 296/98 |
| 4,874,196 | 10/1989 | Goldstein et al. | 296/98 |

FOREIGN PATENT DOCUMENTS

| | | | |
|---|---|---|---|
| 1243062 | 10/1988 | Canada . | |
| 2822451 | 12/1978 | Fed. Rep. of Germany | 296/98 |

*Primary Examiner*—Margaret A. Focarino
*Assistant Examiner*—Joseph D. Pape
*Attorney, Agent, or Firm*—Nixon & Vanderhye

[57] ABSTRACT

The present invention relates to a motorized drive system for covering and uncovering the top of an open truck box or the like and comprises a laterally operated roll tube for winding and unwinding a flexible cover over the top of a truck box. One lateral edge of the cover is fixed to one side edge of the box opening, and the other lateral edge is attached to a roll tube. A reversible rotary motor rotates the roll tube, in conjunction with an extensible pivot arm and a cable return mechanism utilizing a tapered grooved sheave to provide constant tension and to facilitate smooth and consistent rectilinear movement of the roll tube for winding and unwinding of the cover.

13 Claims, 4 Drawing Sheets

FIG. I

DRIVE SYSTEM FOR FLEXIBLE COVER

BACKGROUND OF THE INVENTION

The present invention relates to a motorized drive for a tarpaulin closure system used with an open box-like container such as a truck box or storage bin. A tarpaulin system suitable for the application of the present invention is disclosed in my Canadian Patent 1,132,168 and corresponding U.S. Pat. No. 4,484,777. My aforementioned patents disclose a truck box having parallel side walls joined by transverse front and back end walls, with a flexible fabric cover fixed at one lateral edge to one side wall, and attached at the opposite edge lateral to a roll tube which is rotatable from side-to-side along the top surfaces of the front and back end walls of the truck box to permit winding and unwinding of the fabric from the roll tube thereby opening and closing the cover of the box structure. The foregoing roll tube is operated manually by a shaft crank connected to the roll tube by a universal joint at the back end wall of the box. Different features of lateral roll tube tarpaulin systems are disclosed in U.S. Pat. Nos. 3,384,413 to Sargent; 4,302,043 to Dimmer; and 4,505,512 to Schmeichel and Canadian Patent 1,134,411 to Block.

It has been recognized that an automatic deployment means for a lateral roll tube system, which can be rapidly operated from a remote position such as the cab of a truck or the like, is desirable. U.S. Pat. Nos. 4,095,840 to Woodard and 4,341,416 to Richard disclose motor actuated systems for deploying tarpaulin covers from front to back of a truck box. U.S. Pat. No. 4,673,208 to Tsukamoto discloses a hydraulic system for side-to-side deployment of a canvass system. Canadian Patent 1,243,062 to Hawken and U.S. Pat. No. 4,518,193 to Heider disclose electric systems for side-to-side deployment of a roll tube and canvass tarpaulin system. Each of U.S. Pat. Nos. 4,518,193 and 4,673,208 and Canadian Patent 1,243,062 disclose a complex drive system involving track mechanisms, and in the case of U.S. Pat. No. 4,673,208 a rotational drive for the roll tube which is not coordinated with the rate of lateral translation of the roll tube. In the case of Canadian Patent 1,243,062, the track system for mounting the electric motor is open to the elements and susceptible of binding from airborne debris.

It is an object of the present invention to provide a simplified motor driven box cover deployment system with a minimum of moving parts. It is also an object of the invention to provide a system for maintaining adequate tautness in the tarpaulin or cover during deployment and to ensure that the roll tube remains parallel to the side walls. It is a further object of the invention to provide a system which correlates the lateral movement of the roll tube with the rate of deployment of the fabric cover. It is also an object of the invention to provide a motorized cover deployment system which can be operated remotely.

BRIEF DESCRIPTION OF THE DRAWINGS

The best mode presently contemplated for carrying out the invention in actual practice is shown in the accompanying drawings in which.

Corresponding parts in the respective figures are indicated by similar reference numbers.

DETAILED DESCRIPTION OF THE INVENTION

Figure 1:
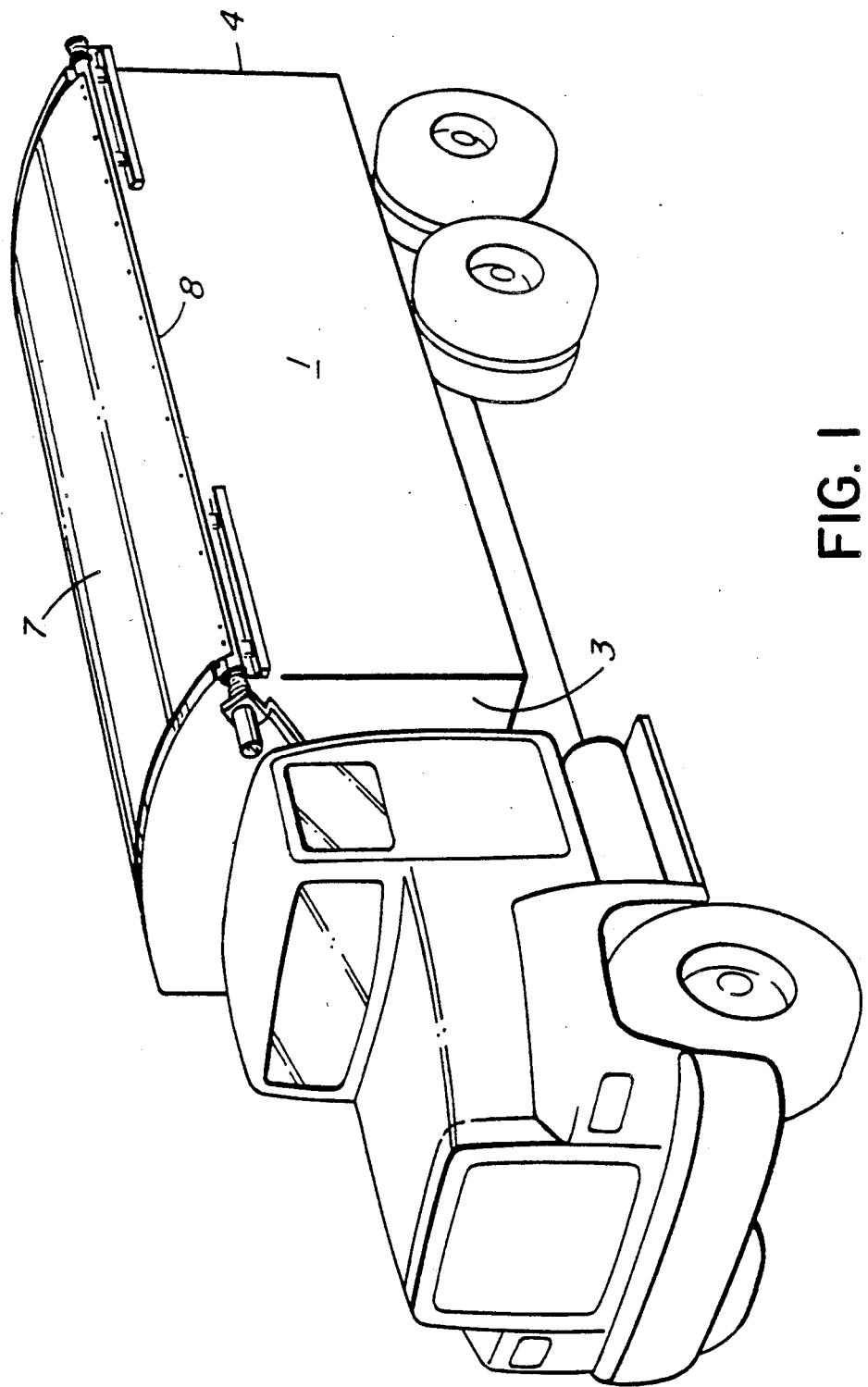
FIG. 1 is a perspective view of a typical truck equipped with the apparatus of the invention.

The present invention is used with a tarpaulin system for a box-like structure, typically an open truck box. Referring to FIG. 1, a typical truck box has generally parallel side walls 1 and 2, and orthogonal front end wall 3 and back end wall 4. The front and back walls 3 and 4 may have a hood with peaked or gabled top rails 5. Located within the box, marginally below the rails 5, are lips 5' which support the front and back edges of the cover 7. Intermediate bows 6 extend across the truck box between the side walls 1 and 2 to assist in support of the cover 7. Typically, a roll tube 8 is positioned upon the end walls 3 and 4, parallel with the side walls 1 and 2. Canvass or other suitable weatherproof flexible fabric cover 7, sufficient in size to enclose the box opening, is attached by one edge 9 to one side wall 2 of the box. The opposite edge 10 of the fabric material 7 is attached to the roll tube by screws 11, rivets or the like. In the closed position, the cover 7 lies over the box opening, supported at its lateral edges 9 and 10 by roll tube 8 and side wall 2 respectively, and upon lips 5' of end walls 3 and 4, as well as intermediate bows 6. As may be seen in FIG. 2, to achieve the open position, the roll tube 8 is rotated counter-clockwise to roll the cover 7 upon the roll tube 8 towards the side 2 of the box to which the lateral edge 9 of the cover 7 is attached, and retained from further movement by appropriate means such as stops 12. To close the box, the roll tube 8 is rotated clockwise towards side wall 1 and the cover 7 is unwound from the roll tube 8 across the box, supported on front wall 3 and back wall 4 and intermediate bows 6. The roll tube 8 and attached cover is held at the opposite side wall 1 by an appropriate closure mechanism (not shown) acting on the roll tube such as tie-down straps or a locking mechanism as illustrated in my Canadian Patent 1,132,168.

Figure 2:
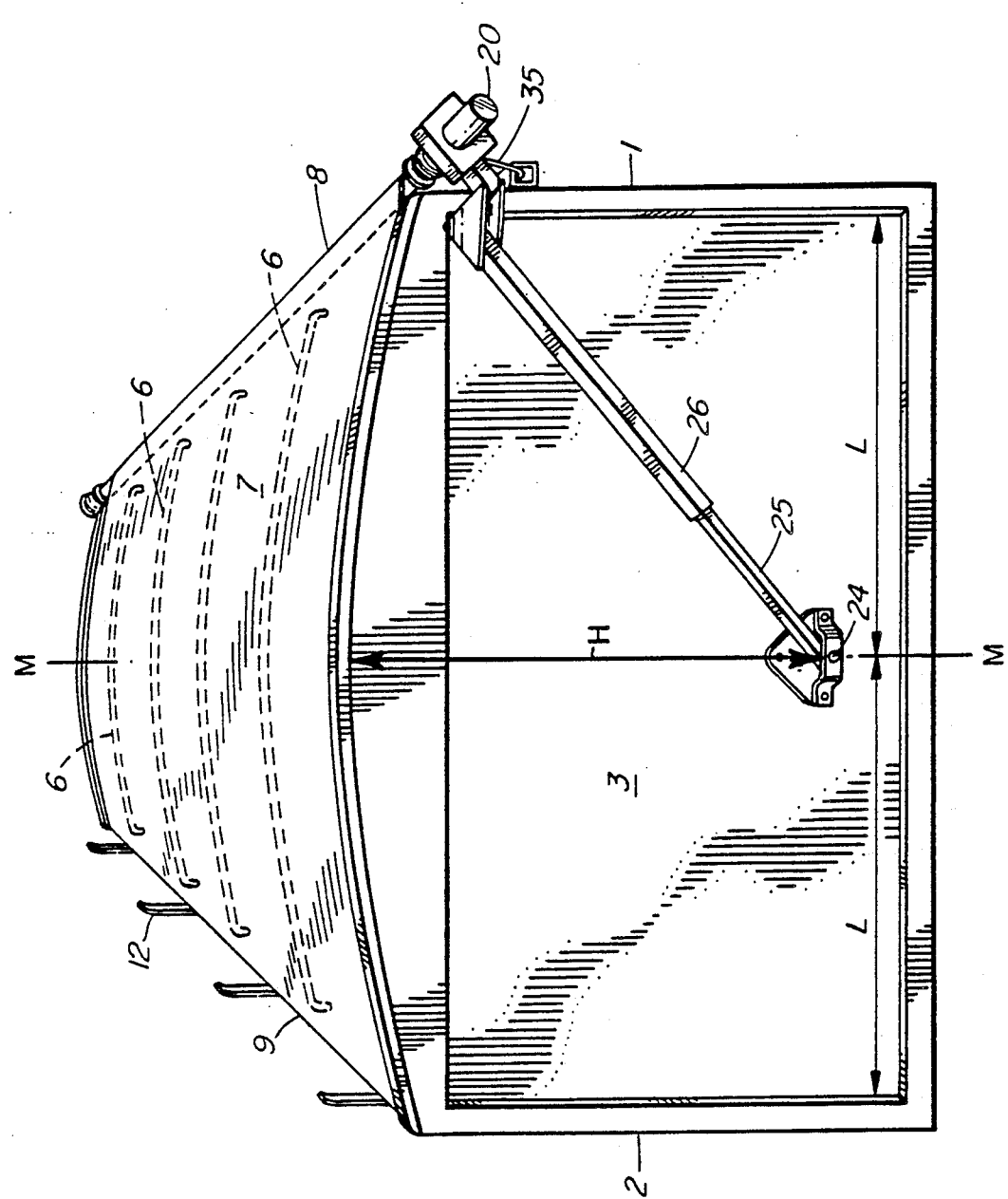
FIG. 2 is a front perspective view of the truck box illustrating the pivot arm and motor system of the present invention.
Figure 3:
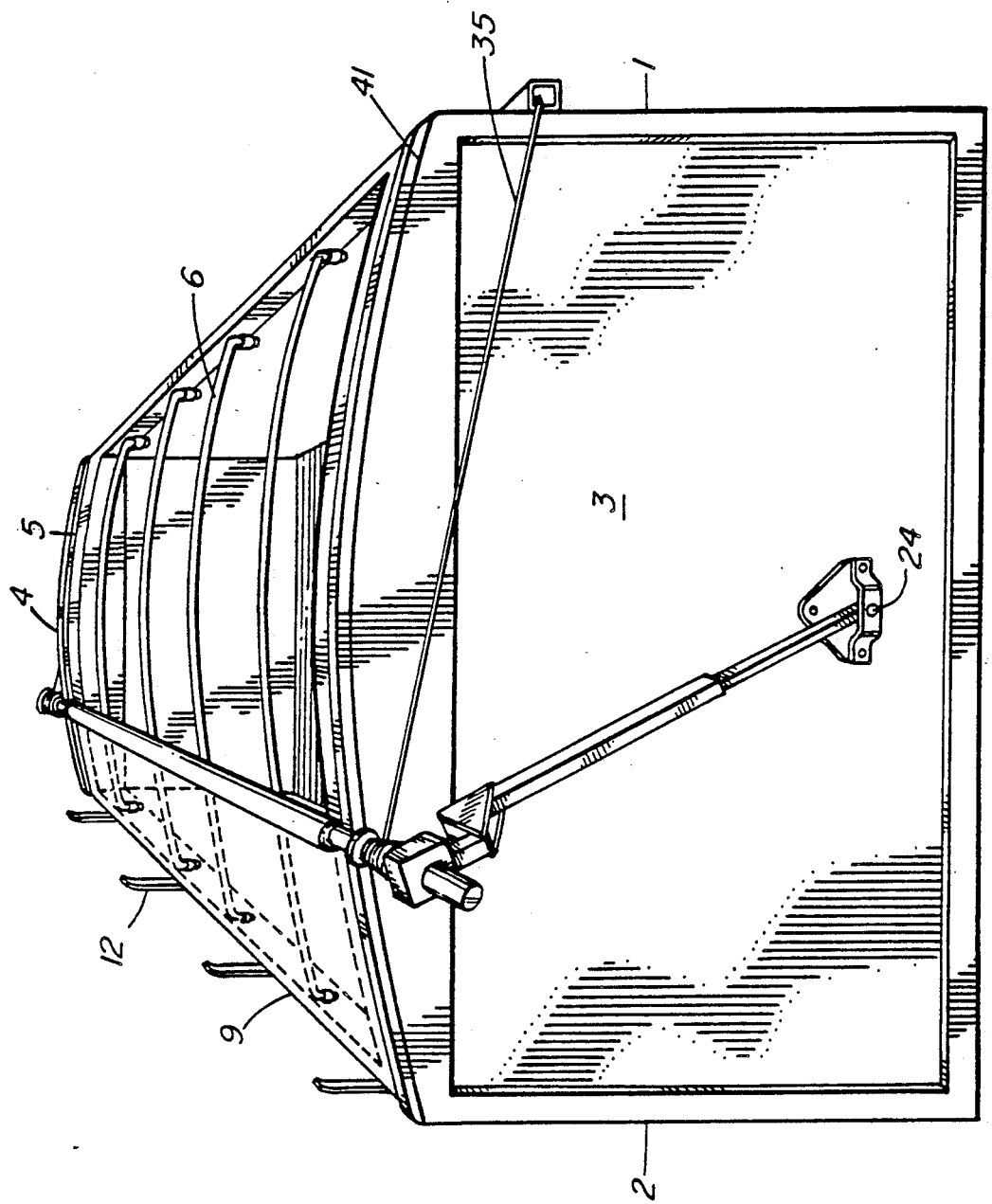
FIG. 3 is a front perspective view of the truck box illustrating the roll tube in a partially deployed position.
Figure 4:
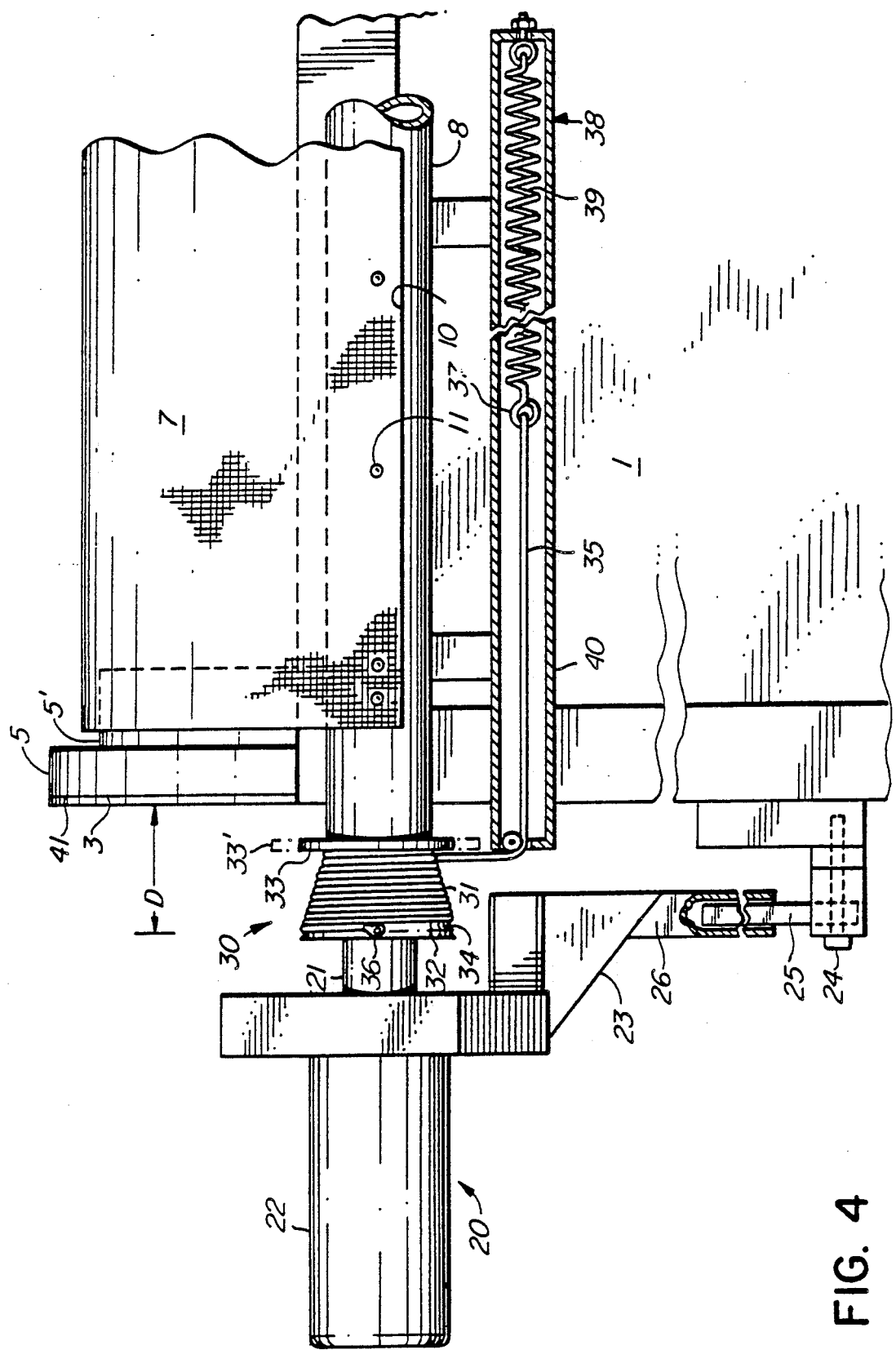
FIG. 4 is a side elevation view of the front end of the roll tube illustrating the tapered sheave and cable return system.

As may be seen particularly in FIG. 4, the front end of roll tube 8 of the present invention extends beyond the front wall 3 and overhangs therefrom a distance D. The back end of the roll tube overhangs the back wall a similar distance. A motor 20, which may be either electrically, pneumatically or hydraulically actuated, is attached to the front end of the roll tube 8. The drive shaft 21 of the motor is coaxially aligned with the roll tube 8. The stator and housing portion 22 of the motor 20 is attached to one end of a pivot arm 23, which prevents the housing from rotating with the rotor of the motor. The other end of pivot arm 23 is fixed at a pivot point or bearing 24 located on a vertical plane M passing through the lateral mid-point of the truck box opening, in this case mid-way between the side walls 1 and 2 of the truck box, a distance L from each side. Thus, the pivot bearing 24 constitutes a pivot point for pivot arm 23 which lies below the top of end wall 3 a distance H which is greater than one-half the width of end wall 3, i.e., H>L as illustrated in FIG 2.

The pivot arm comprises a first rod 25 pivoted at bearing 24, and a second telescoping tube 26 which is rigidly connected to the motor housing 20. As will be discussed hereafter, this freely telescoping or extensible feature permits the pivot arm to accommodate the variation in distance between the pivot 24 and the motor 20 when the roll tube is in the open or closed position, and when it is at an intermediate position.

As may best be seen in FIG. 4, the extension D of the roll tube 8 beyond the front wall 2 towards the motor 20 is configured as a sheave or pulley 30 and has a tapered configuration 31 between transverse plates or cheeks 32 and 33. The tapered sheave 30 has a spiral groove 34 formed on the surface which serves to guide a return cable 35 onto the sheave. The return cable 35 is attached to the tapered sheave portion at the point 36 where the diameter of the sheave 30 is substantially the same or greater diameter as the combined diameter of the roll tube and cover when the cover is fully wound on the roll tube in the open position. The other end of the return cable may be attached to side wall 1 of the truck box adjacent the front end by a tension mechanism 38 or other appropriate means. In the former case, the end of the cable 37 is attached to the free end of a tension spring 39, and the other end of the spring is attached to the closed end of tube 40. The open end of tube 40 may be partially closed by an apertured grommet to reduce entrance of airborne contaminants and may utilize a roller 41 to reduce friction or wear which may arise from limited movement of the return cable 35.

In operation, when the cover is to be opened, the motor is actuated, either electrically, pneumatically or hydraulically, causing the roll tube to be rotated in a counterclockwise direction (when viewed from the front as in FIG. 2) so that the cover 7 is wound on to the roll tube 8 and the roll tube is rotated across the front and back rails 5 towards side wall 2. Simultaneously, as the cover is wound on to the roll tube, the return cable 35 is unwound from the spiral groove 34 of the tapered sheave 30. The taper and groove pitch of the sheave is selected so that the diameter of the sheave at the point where return cable 35 becomes tangent and leaves the sheave is substantially equal to the combined diameter of the roll tube 8 and the cover 7 at all positions across the box. Thus, when the roll tube is fully opened, the diameter of the roll tube 8 and cover 7 is generally the same as the diameter of the sheave at the point where the return cable 35 becomes tangent to the surface 31.

When the cover 7 is closed over the truck box, the motor 20 is actuated to rotate the roll tube 8 clockwise, permitting the cover to unwind from the roll tube. Simultaneously, return cable 35 is re-wound upon the tapered sheave 30 following the spiral groove 34. When the roll tube and cover is completely unwound (and the roll tube is locked in a latch, not shown) the cable leads off the sheave surface 31 where the sheave has a diameter marginally greater than that of the roll tube.

The correlation of the diameter of the sheave 31 to the diameter of roll tube and cover generally at all points during operation of the closure system ensures that the cover remains taut on the tube at all times, and no slack develops in the return cable 35. Thus, the end 37 of the return cable 35 can be fixed to the side wall 1. However, in consequence of expansion and contraction of the length of the return cable 35 and cover 7 as a result of varying temperature conditions and in consequence of movement of the roll tube over the locking mechanism, it is desirable to provide for some compensation in the length of the return cable. As well, adequate tension on the return cable ensures that the cable tracks in the groove 34 of the sheave 31. Compensation and tension may be provided by means of spring 39 within tube 40.

I have found that to maintain the necessary degree of correlation between the tapered sheave and the roll tube and cover, a sheave tapered at 12°, with the groove 34 pitched at 7 turns per inch performs satisfactorily with an 18 ounce P.V.C. coated stable fabric cover.

Although the present invention operates well with a single return cable 35, the degree of success in maintaining the roll tube in precise parallelism with the side edge of the truck box may be increased by utilizing a second return cable on a second tapered pulley at the back end of the roll tube 8 connected to the back wall 4 of the truck box. Such tapered sheave and return cable is operable in the same fashion as the front return cable system. Where spring tubes 40 are used, I have found that 30 to 50 pounds tension in the front tube is sufficient whereas slightly more tension may be maintained in the back tube.

Where an electric motor is utilized, a 12 volt system compatible with the electrical system of a truck can be used with a planetary gear reduction to achieve satisfactory speeds of operation. I have found that an 8½ foot box can be opened or closed in 6 seconds using appropriately selected motor and reduction gear in the system of the present invention. A reduction gear of the type disclosed in U.S. Pat. No. 4,529,098 utilizes the planetary gears which have the salutary effect of resisting rotation of roll tube 8 when the cover is fully open, or fully closed. This rotation of resistance, or an equivalent means, is required to maintain the roll tube 8 in an angle lock of the type disclosed in my Canadian Patent 1,132,168. A simple double throw, center off switch located in the cab can be used to control operation of the motor in opposite directions, whereby the switch is turned off when the roll tube is fully deployed in either the open or closed position.

It may be desired, on occasion, to utilize the foregoing drive system of the present invention when a truck box is in an elevated or inclined dumping position. In such a case, the tapered, grooved sheave 31 may utilize a larger diameter cheek or plate 33' as shown in phantom in FIG. 4. The enlarged portion of cheek 33' will extend below rail 5, and overlie front wall 3 even when the cover is fully wound to its greatest diameter of the roll tube. Cheek 33' may then rest against a rub strip 41 when the drive is activated in an inclined position.

The present disclosure is intended to be illustrative, and not delimiting. It will be appreciated that variations in the drive mechanism, control mechanism, canvass and return system may be utilized without departing from the spirit of the invention.

I claim:

1. A closure system for covering and uncovering a box structure having front and back end walls connected by side walls defining a top rectangular opening, the system comprising:

a flexible cover means for overlying the top of the walls with one edge of the cover fastened to one of the side walls;

a roll tube means for lying parallel to the side walls while supported at the front and back walls, with the opposite edge of the cover fastened to said roll tube;

drive means directly connected to the roll tube to cause the roll tube to rotate and deploy the cover from the roll tube across the opening of the box;

and at least one return mechanism comprising a return cable means for fixation between the box structure and a tapered sheave rotatable with the roll tube, wherein the return cable is deployed from the tapered sheave at a rate equal to the rate of deployment of the cover onto the roll tube.

2. The closure system of claim 1, wherein the surface of the tapered sheave has guide means formed on the surface to accommodate and position the return cable.

3. The closure system of claim 1, wherein the sheave is aligned with and connected to the roll tube.

4. The closure system of claim 1, wherein the sheave portion overhangs the adjacent end wall.

5. The closure system of claim 1, in which the drive means is an electric or hydraulic.

6. The closure system of claim 1, wherein the diameter of the sheave at the point of tangency of the return cable at any time during operation of the closure system generally corresponding to the diameter of the roll tube and the cover thereon at the same time.

7. The closure system of claim 6, wherein the axis of the sheave is parallel with but spaced from the axis of the roll tube.

8. The closure system of claim 2, wherein the guide means is a spiral groove.

9. The closure system of claim 1, wherein the taper is in the range of 5° to 30°.

10. A closure system for covering and uncovering a box structure having front and back end walls connected by side walls defining a top rectangular opening, the system comprising:

a flexible cover means for overlying the top of the walls with one edge of the cover fastened to one of the side walls;

a roll tube means for lying parallel to the side walls while supported at the front and back walls, with the opposite edge of the cover fastened to said roll tube;

drive means directly connected to the roll tube to cause the roll tube to rotate and deploy the cover from the roll tube across the opening of the box, wherein the drive means comprises rotation means connected at one end of said roll tube and housing means connected to one end of a passively extensible pivot arm pivotable at its other end about a pivot point at the lateral mid-point of one end wall, wherein the length of the pivot arm can increase or decrease to adjust solely to differences in the radial distance between said pivot point and the axis of the roll tube at all positions during deployment of the cover;

and at least one return mechanism comprising a return cable means for fixation between the box structure and a tapered sheave rotatable with the roll tube, wherein the return cable is deployed from the tapered sheave at a rate equal to the rate of deployment of the cover onto the roll tube.

11. The closure system of claim 10, wherein the pivot point is below the top of said one end wall by a distance exceeding one-half of the width of the said one end wall.

12. The closure system of claim 10, wherein the drive means, pivot arm, and return mechanism are positioned generally adjacent the front wall of the box structure, and a second return mechanism is positioned generally adjacent the back wall of the box structure.

13. The closure system of claim 10, wherein the diameter of the sheave at the point of tangency of the return cable at any time during operation of the closure system generally corresponds to the diameter of the roll tube and the cover thereon at the same time.

* * * * *